UNITED STATES PATENT OFFICE.

HUGH C. SICARD, OF BUFFALO, NEW YORK, ASSIGNOR TO UNITED STATES FERRO-ALLOYS CORPORATION, OF NEW YORK, N. Y., A CORPORATION OF NEW YORK.

PROCESS FOR PRODUCING LOW-CARBON FERROTITANIUM.

1,374,035.     Specification of Letters Patent.     Patented Apr. 5, 1921.

No Drawing.     Application filed August 18, 1919. Serial No. 318,328.

*To all whom it may concern:*

Be it known that I, HUGH C. SICARD, a citizen of the United States of America, residing in the city of Buffalo, county of Erie, and State of New York, have invented certain new and useful Improvements in Processes for Producing Low-Carbon Ferrotitanium, of which the following is a full, clear, and exact description.

This invention relates to the production of ferrotitanium and comprises certain novel steps by which that material can be produced.

The ordinary commercial grades of ferrotitanium contain from 10% to 20% titanium and from 6% to 9% carbon. The carbon in the alloy exists in a combined form probably as a double carbid of iron and titanium. For many purposes in making steel a considerable quantity of ferro-titanium is required and under these circumstances it is necessary to have a ferro-titanium low in carbon, for example, one having not more than 1% carbon.

In carrying out my invention I decarbonize the ordinary ferro-titanium by heating it with titanic oxid at a temperature of at least 1600° C. and preferably higher, since the higher the temperature the more rapidly the reaction goes on. The ferro-titanium is first crushed, then intimately mixed with titanic oxid which may be in the form of any titaniferous ore, but is preferably rutile containing 96% $TiO_2$ or better. The amount of titanic oxid mixed with the ore is considerably in excess of that theoretically required to remove all the carbon from the ferro-titanium for a reason which will shortly appear. The mixture is then charged in an electric furnace of the covered type such as used in the manufacture of steel and melted. When molten we have a mass of molten metal covered with a blanket of slag consisting principally of titanic oxid. It is in order to form this protective blanket of molten titanic oxid that the excess of titanic oxid is put in the mixture. The molten metal is now decarbonized, the reactions which occur during the process being probably represented by the following equations:

$$2TiC + TiO_2 = 3Ti + 2CO$$
$$2FeC + TiO_2 = Fe + Ti + 2CO$$

During the process the molten mass is vigorously stirred with an iron rod. The completion of the reaction is recognized when the evolution of carbon monoxid (CO) gas ceases. The metal is then cast in the usual manner.

Having thus described my invention, what I claim is:

1. The method of producing low-carbon ferro-titanium which comprises the mixing of commercial ferro-titanium with an excess of titanic oxid and then heating the mixture in an electric furnace so as to decompose the double carbid of titanium and iron and form a protective blanket of slag which consists substantially of titanic oxid.

2. The method of producing low-carbon ferro-titanium which comprises the mixing of commercial ferro-titanium with an excess of titanic oxid, then charging the mixture into an electric furnace of the covered type, then subjecting the mixture to a temperature of at least 1600° C. until it is thoroughly melted whereby the double carbid of titanium and iron is decomposed and a protective blanket of slag composed mainly of titanic oxid is formed.

3. The method of producing low-carbon ferro-titanium which comprises the mixing of commercial ferro-titanium with an excess of titanic oxid, then charging the mixture into an electric furnace of the covered type, then subjecting the mixture to a temperature of at least 1600° C. until it is thoroughly melted, and then vigorously stirring the molten mass with a suitable rod to facilitate the decarburation, whereby the double carbid of titanium and iron is decomposed and a protective blanket of slag composed mainly of titanic oxid is formed.

4. The method of producing low-carbon ferro-titanium which comprises the crushing of commercial ferro-titanium, then intimately mixing the crushed ferro-titanium with titanic oxid and then heating the mixture in an electric furnace so as to decompose the double carbid of titanium and iron and form a protective blanket of slag which consists substantially of titanic oxid.

In testimony whereof, I have hereunto signed my name.

HUGH C. SICARD.